(12) United States Patent
Cherveny et al.

(10) Patent No.: US 6,853,913 B2
(45) Date of Patent: Feb. 8, 2005

(54) SYSTEM AND METHOD FOR UPDATING, ENHANCING, OR REFINING A GEOGRAPHIC DATABASE USING FEEDBACK

(75) Inventors: Kevin Cherveny, Wilmington, IL (US); Aaron Crane, Palatine, IL (US); Lawrence M. Kaplan, Chicago, IL (US); John Jasper, Arlington Hts, IL (US); Russel Shields, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 10/298,798

(22) Filed: Nov. 18, 2002

(65) Prior Publication Data

US 2003/0125871 A1 Jul. 3, 2003

Related U.S. Application Data

(63) Continuation of application No. 09/532,751, filed on Mar. 22, 2000, now Pat. No. 6,516,267, which is a continuation of application No. 08/951,767, filed on Oct. 16, 1997, now Pat. No. 6,047,234.

(51) Int. Cl.$^7$ ........................ G06F 165/00; G12B 13/00
(52) U.S. Cl. ...................... 701/208; 701/214; 340/988; 340/995
(58) Field of Search ................................ 701/208, 200, 701/213, 207, 212, 214, 211, 1, 117; 340/995, 990, 988; 342/357.13, 357.17, 457, 454; 345/428, 751

(56) References Cited

U.S. PATENT DOCUMENTS

| | | | |
|---|---|---|---|
| 4,982,332 A | 1/1991 | Saito et al. | 701/208 |
| 4,989,151 A | 1/1991 | Nuimura | 701/208 |
| 5,046,011 A * | 9/1991 | Kakihara et al. | 340/990 |
| 5,146,219 A | 9/1992 | Zechnall | 340/445.2 |
| 5,164,904 A | 11/1992 | Sumner | 701/117 |
| 5,243,528 A | 9/1993 | Lefebvre | 701/211 |
| 5,272,638 A * | 12/1993 | Martin et al. | 340/990 |
| 5,315,295 A | 5/1994 | Fujii | 340/936 |
| 5,374,933 A | 12/1994 | Kao | 342/357.1 |
| 5,440,484 A * | 8/1995 | Kao | 701/207 |

(List continued on next page.)

FOREIGN PATENT DOCUMENTS

| | | |
|---|---|---|
| DE | 195 25 291 | 12/1996 |
| EP | 0377 480 | 7/1990 |
| EP | 0 715 286 | 6/1996 |
| EP | 0752 692 | 1/1997 |
| EP | 0755 039 | 1/1997 |
| WO | WO 97/29470 | 8/1997 |
| WO | WO 98/54682 | 12/1998 |

OTHER PUBLICATIONS

Jun. 05, 2000, European Search Report for EP 98 30 8256.

*Primary Examiner*—Thomas G. Black
*Assistant Examiner*—Tuan C To
(74) *Attorney, Agent, or Firm*—Jon D. Shutter; Frank J. Kozak; Lawrence M. Kaplan

(57) ABSTRACT

A system for updating, enhancing and/or refining a geographic database is disclosed. The system uses a plurality of data collecting sensors, each of which is installed in a separate one of a plurality of vehicles, each of which travels on roads in a geographic region. Each data-collecting sensor provides outputs indicative of the sensing of one or more features in the geographic region as the vehicle in which it is installed travels. A computer program process compares the outputs of the data collecting sensors to previously obtained data that represent the physical features, determines the significance of the comparisons, and updates, enhances, or refines the data in an existing geographic database accordingly. Data that have been updated, enhanced, or refined, are provided back to end users.

19 Claims, 15 Drawing Sheets

U.S. PATENT DOCUMENTS

| | | | | |
|---|---|---|---|---|
| 5,483,453 A | * | 1/1996 | Uemura et al. | 318/587 |
| 5,485,161 A | * | 1/1996 | Vaughn | 342/357.13 |
| 5,488,559 A | * | 1/1996 | Seymour | 342/457 |
| 5,504,482 A | * | 4/1996 | Schreder | 340/995 |
| 5,543,789 A | | 8/1996 | Behr et al. | 340/995.1 |
| 5,566,072 A | | 10/1996 | Momose et al. | 701/117 |
| 5,614,895 A | * | 3/1997 | Ohomori et al. | 340/995 |
| 5,699,056 A | | 12/1997 | Yoshida | 340/905 |
| 5,699,255 A | * | 12/1997 | Ellis et al. | 342/450 |
| 5,731,978 A | | 3/1998 | Tamai et al. | 701/201 |
| 5,774,824 A | * | 6/1998 | Streit et al. | 701/207 |
| 5,812,069 A | | 9/1998 | Albrecht et al. | 340/905 |
| 5,828,585 A | | 10/1998 | Welk et al. | 702/96 |
| 5,844,505 A | | 12/1998 | Van Ryzin | 340/988 |
| 5,922,036 A | | 7/1999 | Yasui et al. | 701/28 |
| 5,933,100 A | * | 8/1999 | Golding | 701/208 |
| 5,948,042 A | | 9/1999 | Heimann et al. | 701/208 |
| 5,951,620 A | * | 9/1999 | Ahrens et al. | 701/200 |
| 5,961,571 A | | 10/1999 | Gorr et al. | 477/13 |
| 6,006,161 A | * | 12/1999 | Katou | 701/212 |
| 6,061,625 A | | 5/2000 | Fastenrath | 701/117 |
| 6,072,396 A | | 6/2000 | Gaukel | 340/573.4 |
| 6,144,916 A | | 11/2000 | Wood, Jr. et al. | 701/200 |
| 6,154,152 A | | 11/2000 | Ito | 340/988 |
| 6,173,231 B1 | | 1/2001 | Chojnacki | 701/208 |
| 6,178,374 B1 | | 1/2001 | Mohlenkamp et al. | 701/117 |
| 2004/0098191 A1 | * | 5/2004 | Becker et al. | 701/200 |

* cited by examiner

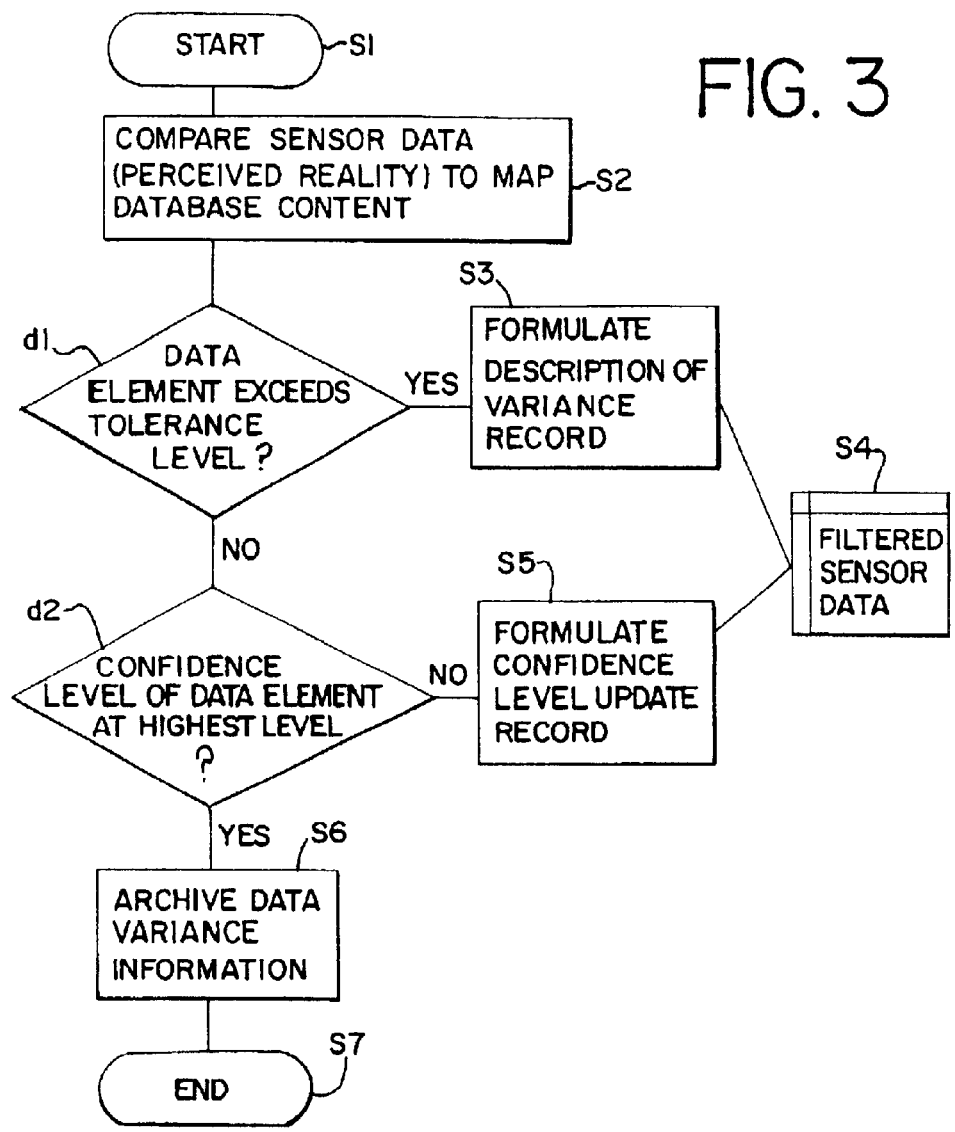
FIG. 3
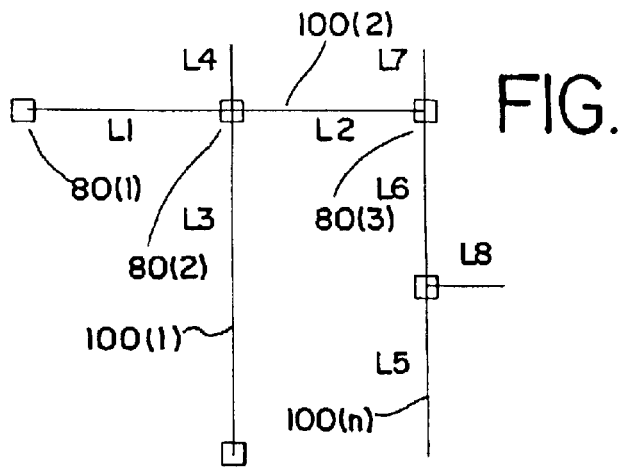
FIG. 4A
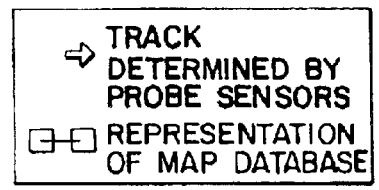

SYSTEM AND METHOD FOR UPDATING, ENHANCING, OR REFINING A GEOGRAPHIC DATABASE USING FEEDBACK

The present application is a continuation of Ser. No. 09/532,751, filed Mar. 22, 2000, now U.S. Pat. No. 6,516,267, which was a continuation of Ser. No. 08/951,767, filed Oct. 16, 1997, now U.S. Pat. No. 6,047,234.

BACKGROUND OF THE INVENTION

The present invention relates to a system and method for updating and enhancing a geographic database, and more particularly, the present invention relates to a system and method for updating and enhancing a geographic database based on feedback from field use of the geographic data.

Computer-based navigation systems for use on land have become available in a variety of forms and for a variety of applications. One exemplary type of system uses a geographic data set, a navigation application, and optionally, a positioning system. The geographic data set includes information about the positions of roads and intersections in or related to a specific geographical area, and may also include information about one-way streets, traffic signals, stop signs, turn restrictions, street addresses, alternative routes, hotels, restaurants, museums, stadiums, offices, automobile dealerships, auto repair shops, etc.

The optional positioning system may employ any of several well-known technologies to determine or approximate one's physical geographic location. For example, the positioning system may employ a GPS-type system (global positioning system), a "dead-reckoning"-type system, or combinations of these, or other systems, all of which are known in the art.

The navigation application portion of the navigation system is a software program that uses the detailed geographic data set and the positioning system (when employed). The navigation application program may provide the user with a graphical display (e.g. a "map") of a specific location in the geographical area. The navigation application may provide the user with data indicating his own location and specific directions to locations in the geographical area from wherever he is located.

Computer-based navigation systems may exist as a single unit that may be installed in a vehicle, or even carried by persons. The navigation application and geographic data set may be provided as software products that are sold or licensed to users to load in personal computers. Systems operating on personal computers may be stand-alone or connected by a communication link to a central or regional system. Organizations, such as trucking companies, package delivery services, and emergency dispatch units may employ navigation systems to track fleets and ensure the quickest routes to destinations. The navigation systems may also be made available on-line from a central system to multiple users on an "as needed" basis, or from on-line services such as services available on the Internet and private dial-up services.

Individual users can use navigation systems to obtain directions to a desired destination thereby reducing travel time and expenses. The directions can include detours around construction delays. Directions may be provided to street addresses, intersections, or to entities by name, such as to restaurants, hotels and service stations.

One potential obstacle to providing enhanced features with a navigation system is the difficulty in maintaining up-to-date information in the geographic data set. A publisher of geographic data may obtain the information that becomes part of geographic data sets from field personnel sent to the locations to record the information or from aerial photographs or municipal records or other sources. Geographic information, however, becomes outdated as new roads are built, existing roads are changed, traffic signals are installed, businesses change their hours of operation, new businesses open, existing businesses close, etc. When changes occur, data in the geographic data set becomes inaccurate and its utility is thereby lessened.

Information identifying changes are collected using the same techniques as described above. Once the information regarding changes is collected, it is incorporated into a master geographic data set. The publisher of geographic databases then periodically distributes updated geographic data reflecting the changes to end-user. However, the process of acquiring information regarding changes is time-consuming and expensive. Moreover, existing methods of acquiring updated data may become increasingly expensive as geographic databases become more detailed and extensive in scope.

Another limitation with existing methods of data acquisition is accuracy. Even with high quality aerial photographs and other existing collection methods, the geographic coordinates of features may not always be entered in the database with a high level of precision. While existing methods are generally adequate to provide geographic data of sufficient accuracy for vehicle positioning in route guidance applications, greater geographical accuracy may be required for certain other applications, such as vehicle control.

Accordingly, a system and method are desired that would provide for a more efficient acquisition of information reflecting changes and corrections in geographic areas to navigation systems. Further, a system and method are desired that allow the accuracy of the data in a geographic database to be enhanced.

SUMMARY OF THE INVENTION

In view of the above, a first aspect of the present invention is directed to a system for updating, enhancing and/or refining a geographic database. A geographic database includes data representing physical features in the geographic region, and, optionally, attributes of such features. The system includes a plurality of data collecting sensors. Each of the data collecting sensors is installed in a separate one of a plurality of vehicles each of which is capable of traveling on roads in a geographic region. Each of the data collecting sensors provides outputs indicative of one or more features in the geographic region as the vehicle in which it is installed travels on the roads in the geographic region. A computer program executes a feedback process on the geographic database using the outputs of the data collecting sensors. A first part of the feedback program compares the outputs of the data collecting sensors to the data identifying the physical features and provides results representative of the comparisons. A second part of the feedback program is responsive to the results from the first part and determines the significance of the comparisons. A third part of the feedback program modifies the data in the geographic database based upon the significance determined by the second part of the program.

In a further aspect of the system, the data in the geographic database representing physical features in the geographic region are updated, enhanced, or refined based upon the significance determined by the feedback program.

In another aspect of the invention, the data which has been updated, enhanced, or refined, is used to provide updated, enhanced, or refined data in end-user vehicles, some of which may include the vehicles in which data collecting sensors have been installed.

According to another aspect of the invention, sensors in end-users' vehicles are calibrated to high levels of accuracy using the data which has been updated, enhanced or refined using a feedback process.

According to still another aspect of the invention, an out-of-calibration sensor in an end-user's vehicle is detected and re-calibrated using the data which has been updated, enhanced or refined using a feedback process.

In yet still another aspect of the invention, using a feedback process, levels of confidence of accuracy are assigned to data in the geographic database representing physical features in the geographic region, thereby enabling the data to be used for purposes requiring high levels of confidence.

In the aspects mentioned above, the data collecting sensors may be used to sense the geographic position of the vehicle (derived from GPS, dead-reckoning, or other positioning systems), vehicle speed, road gradient, lane width (derived from radar, and other similar systems), signage (derived from cameras), road direction (derived from an on-board compass or other heading-determining means), and various other physical features. The data in the geographic database may represent roads (or road segments) and their positions, as well as other attributes relating to roads.

In another aspect, the present invention is directed to a method of updating a geographic database by the steps of storing road data that includes a plurality of map positions in the geographic database. A plurality of actual positions traveled is determined by a vehicle by repeatedly sensing actual position while the vehicle moves. At least a portion of the plurality of actual positions is matched with a plurality of map positions in the geographic database. A position difference is calculated between each actual position in the plurality of actual positions and the plurality of map positions. Each actual position for which the position difference exceeds a predetermined tolerance level is stored as a plurality of unmatched positions.

DETAILED DESCRIPTION OF THE DRAWINGS

FIG. 3 is a flow chart illustrating a method for processing sensor data using the system of FIG. 1.

FIGS. 4A–4E illustrate the application of the method of using the system of Figure to update a geographic data set.

DETAILED DESCRIPTION OF THE PRESENTLY PREFERRED EMBODIMENTS

I. System Overview

Figure 1:
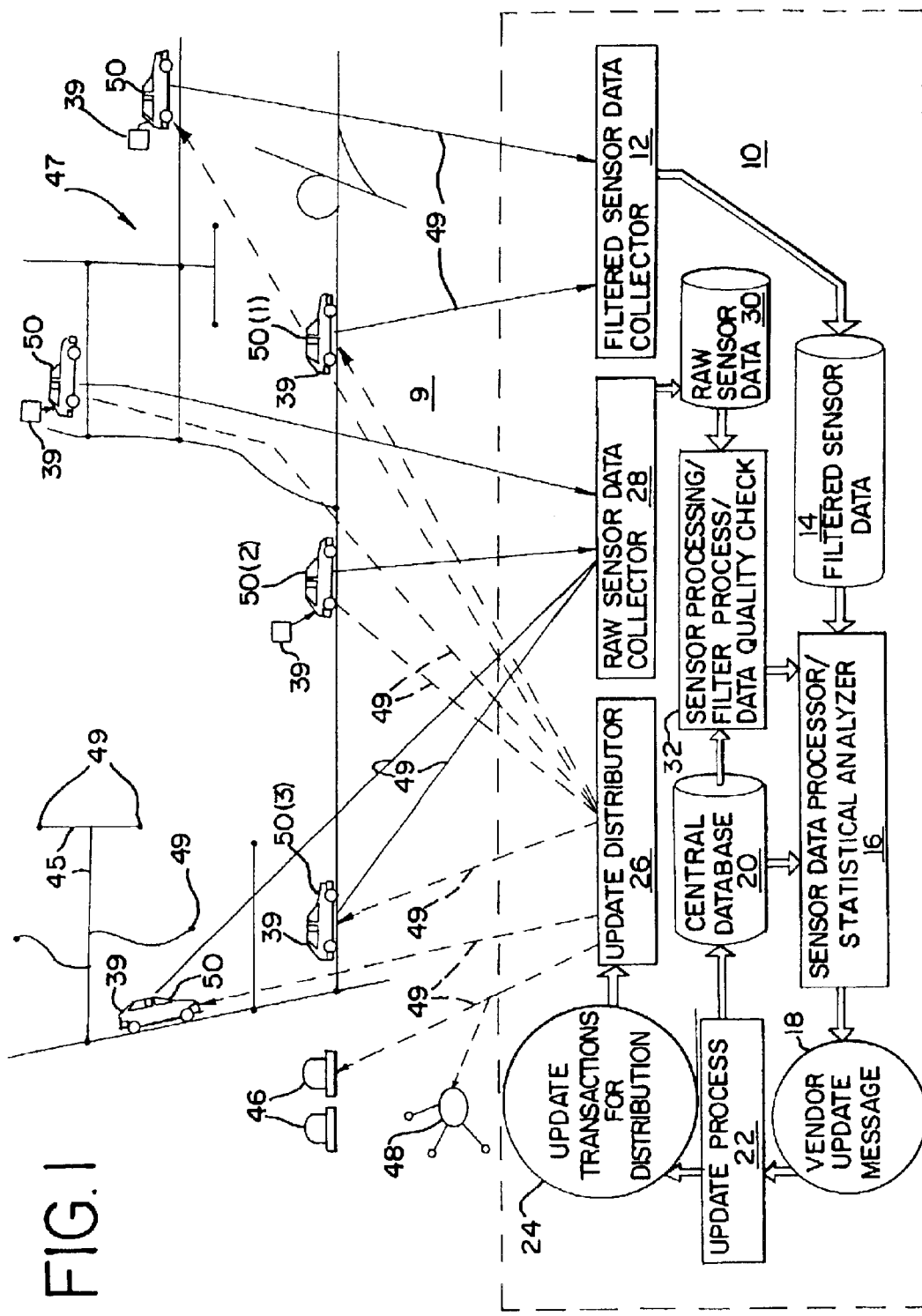
FIG. 1 is a diagram illustrating a system according to a first embodiment.

Referring to FIG. 1, a system 9 for updating and enhancing a geographic database includes a central geographic data manager 10. The central geographic data manager 10 includes a central geographic database 20. The geographic database 20 includes data that represents physical features in a geographical area 47. The central geographic database 20 may include data descriptive of position data in terms of points 44 on the map and of links, or segments of roads 45. The central geographic database 20 may also include data representing road gradients, road widths, lane widths and shoulder widths, and data that is descriptive of stationary objects such as stop signs, buildings, bridge supports, etc. The central geographic database 20 may include non-positional features such as speed limits, the direction of travel allowed on the roads and the directions of allowed turns. The central geographic database 20 may include other types of information as well, for example, types of restaurants, museum hours, etc.

Located in the geographic region 47 are a plurality of data collection vehicles 50 (including vehicles 50(1), 50(2) . . . 50(n)). Each of the data collection vehicles 50 includes a data collection system 39. Each data collection system 39 includes one or more sensors capable of collecting data representing physical features about the environment of the vehicle or the vehicle's physical position as the vehicle is moving or while it is stopped. As each of the data collection vehicles 50 moves on the roads (or is stopped) in the geographic area 47, the sensors in the data collection system of the vehicle sense physical features. These data collection vehicles 50 may include vehicles in which in-vehicle navigation systems are installed, or vehicles which have only data collection system equipment without on-board navigation systems, or may include both types of vehicles. The plurality of vehicles 50 may include vehicles which are owned (or leased) by private party end-users as well as fleet vehicles. Some of the data collection vehicles 50 include local copies of a geographic database 56 (shown in FIGS. 2A and 2B) which may be a copy or version of a portion of the central geographic database 20. The data collection vehicles 50 communicate data derived from their data collection systems to the central geographic data manager 10 using suitable communications links 49.

II. Data Collection Vehicles

Figure 2A:
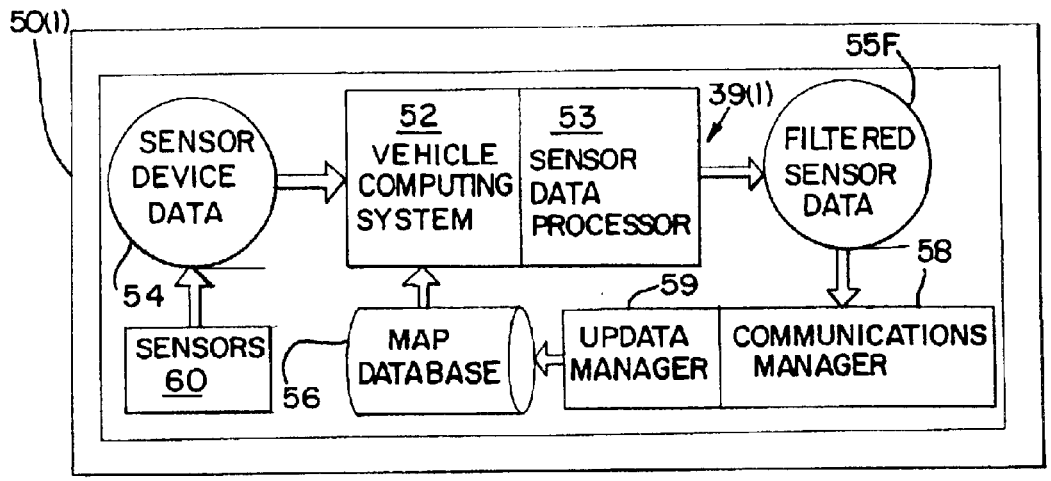
FIGS. 2A–2C are diagrams illustrating alternative embodiments of the data collection vehicles shown in FIG. 1.
Figure 2B:
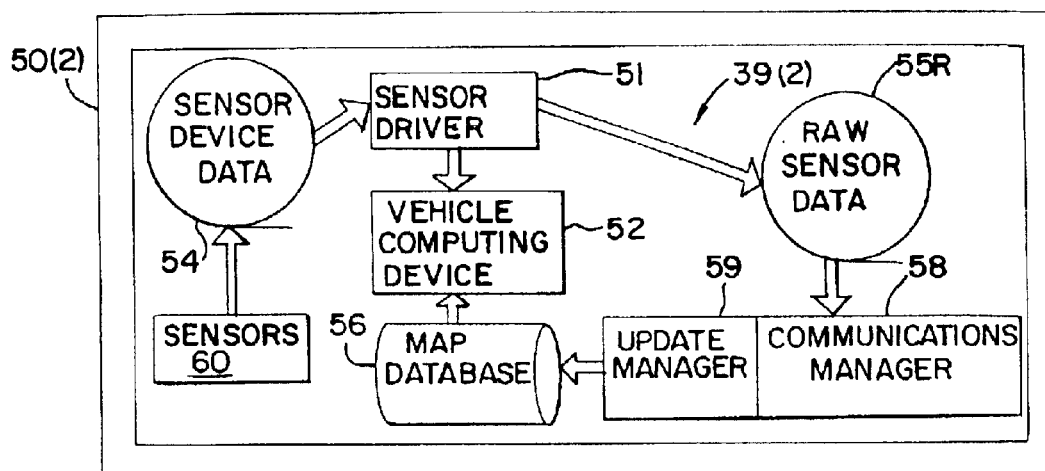
Figure 2C:
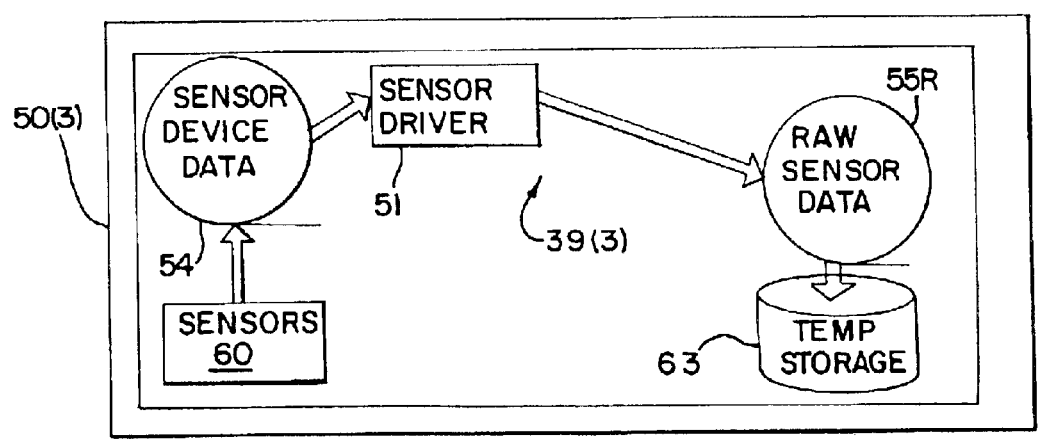

FIGS. 2A–2C illustrate alternative embodiments of the data collection vehicles 50.

FIG. 2A illustrates an embodiment of a data collection vehicle 50(1) which processes sensor data 54 into filtered sensor data 55F for communication to the central geographic data manager 10. The data collection vehicle 50(1) includes a data collection system 39(1) which includes a vehicle computing system 52, a sensor data processor 53, a communications manager 58, a local map database 56, and one or more sensors 60. (The data collection vehicle 50(1) may also include an update manager 59 which is not necessarily part of the data collection system 39(1).) In this embodiment of the data collection vehicle, parts of the data collection system 39(1) may be shared with an in-vehicle navigation system. For example, the sensors 60, the vehicle computing system 52 and the map database 56 may be components of an in-vehicle navigation system and may be used by the vehicle driver for such purposes.

The outputs of the one or more sensor devices 60 provide sensor device data 54. The sensor devices 60 may include a GPS (Global Positioning System), an imaging system (e.g. radar, cameras, etc.), a gyroscope, a compass, an odometer and other sensors. The sensor devices 60 output data 54 as the vehicle 50(1) moves around the geographic region 47 or while it is stopped. The output 54 from the sensor devices 60 is provided to the vehicle computing system 52 of the data collection system 39(1).

The sensor data processor 53, using the data 54 output from the sensors 60 to the vehicle computing system 52, compares the sensor device data 54 with data in the local map database 56. The sensor data processor 53 may be implemented as a computer program executed on the CPU of the vehicle computing system 52 or may executed on a separate processor. The sensor data processor 53 determine variances between the sensor device data 54 and the data in the local map database 56 based on comparisons between the sensor device data 54 and corresponding elements in the map database 56. The variances depend upon the type of data being compared. For example, if the output of a position sensor is being compared to a corresponding position in the local map database 56, the variance may be a distance representing the difference between the two values. The variance may also include the relative direction of the difference. The variance is compared to threshold levels above or below which the sensor output may be considered unmatched to a map database element. The threshold levels may be based on factors such as the tolerances of the sensors.

The sensor data processor 53 processes the sensor data 54 into filtered sensor data 55F. The filtered sensor data may include only the variances that exceed a certain predefined threshold. The filtered sensor data may be temporarily stored on a data storage device (not shown) in the vehicle.

In one embodiment of the data collection vehicle 50(1), the communications manager 58 is used to transmit the filtered sensor data 55F to the central geographic data manager 10 of FIG. 1. The communications manager 58 may utilize any appropriate means for data transmission, including wireless (49 in FIG. 1), cellular, modem uploads, e-mail, and so on. Data may be communicated at any time. For example, data may be communicated as it is obtained. Alternatively, the data 55F may be stored and communicated at a fixed time, such as daily or weekly at a specified time. The data 55F may also be communicated to an intermediate data collection system and then transferred to the manager 10. In another alternative embodiment, data is collected in the vehicle on a disk and uploaded by modem or sent by mail to the manager 10.

In the embodiment of FIG. 2A, data maybe selected from the filtered sensor data 55F for communication to the central geographic data manager 10. For example, data that indicates variances beyond a certain level may be selected for communication to the central geographic data manager 10. Alternatively, all of the filtered sensor data 55F, including variances that indicate a perfect match between sensor device data and data in the local database 56 may be communicated to the central geographic data manager 10. By sending all of the filtered sensor data 55F, the central geographic data manager 10 may determine the reliability of the geographic database 20 by confirming the accuracy of the existing data in the central geographic database 20.

FIG. 2B illustrates another embodiment of a data collection vehicle 50(2). The embodiment 50(2) of FIG. 2B collects raw sensor data and communicates it to the central geographic data manager 10. The data collection vehicle 50(2) includes a data collection system 39(2) which includes a sensor driver 51, a vehicle computing system 52, a communications manager 58, a local map database 56, and one or more sensors 60. (The data collection vehicle 50(2) may also include an update manager 59 which is not necessarily part of the data collection system 39(2).) As in the embodiment of FIG. 2A, an in-vehicle navigation system may be used as part of the data collection system.

The outputs of the one or more sensor devices 60, which may be the same as those identified above, provide sensor device data 54. The sensor devices 60 collect data as the vehicle 50(2) moves around or stops in the geographic region 47. A sensor driver 51, which may be a software program, processes the sensor device data 54 into raw sensor data 55R. (The functions performed by the sensor driver 51 may include, for example, converting essentially analog outputs of sensors 60 into appropriate digital data, scaling the data, time stamping the data, compressing the data, identifying the types of sensors that generate the data, organizing the raw data for storage purposes, and so on.) The raw sensor data 55R may be temporarily stored in a data storage device (not shown) in the vehicle 50(2). The raw sensor data 55R is communicated to the central data manager 10. The communications manager 58, which may be similar to the communications manager in the embodiment of FIG. 2A, may be used for this purpose.

Another embodiment of a data collection vehicle 50(3) is illustrated in FIG. 2C. The data collection vehicle 50(3) includes a data collection system 39(3) including a sensor driver 51, a temporary storage 63, and sensors 60. These components perform similar functions as the like numbered components in FIGS. 2A and 2B. As shown, the data collection vehicle 50(3) in FIG. 2C does not include an in-vehicle navigation system. The data collection vehicle 50(3) in FIG. 2C stores raw sensor data 55R in the temporary storage 63. A user then transfers the data to a floppy disk or to a removable hard disk drive and physically sends the data to the central data manager 10. Alternatively, the data collection system 39(3) in the vehicle may include a communications manager that provides functions, similar to those described above, to transfer the data to the central data manager.

III. Central Geographic Data Manager

A. Collection of Data from Vehicles

The central geographic data manager 10 illustrated in FIG. 1 includes hardware and software components for receiving data 55R and 55F from the data collection vehicles 50 and for processing the data to generate updates, refinements, and/or enhancements to the central geographic database 20. The central geographic data manager 10 may also assign levels of reliability to data in the database 20, as described below. The hardware and software components need not be located in one location or operate on one computer. Different components may be located in different places with known communications techniques used to connect them.

The central geographic data manager 10 receives raw sensor data 55R from the data collection vehicles 50(2), 50(3) that communicate non-filtered data at a raw data collector 28. The central geographic data manager 10 receives filtered data 55F from the data collection vehicles 50(1) at a filtered data collector 12. The filtered sensor data collector 12 and the raw sensor data collector 28 are interfaces to the communication links 49 and may be implemented by any suitable technology for receiving data. Each collector handles the data received from its corresponding plurality of data collection vehicles 50 and forwards the data to the appropriate processes in the central geographic data manager 10.

The filtered data collector 12 stores and organizes the filtered sensor data 55F in a central filtered sensor database 14. For vehicles that communicate raw data 55R to the central geographic data manager 10, the raw data collector 28 organizes the raw sensor data from the plurality of vehicles in a central raw data database 30. This collection of data is analyzed for variances by a central sensor data processor 32. The central sensor data processor is a computer program, similar to the local sensor data processor 53 of FIG. 2A, capable of calculating variances based on comparisons of the raw data with the geographic data in the central database 20. The central sensor data processor 32 stores variances as filtered sensor data in the filtered sensor database 14.

B. Updating/Enhancing the Central Database

The collection of data in the filtered sensor database 14 is analyzed by a statistical data analyzer 16. The statistical data analyzer 16 includes a computer program that applies statistical analysis techniques based on further comparisons with the geographic data in the central geographic database 20. The statistical analysis techniques may take into account thousands or millions of sensor readings to derive results with a high level of reliability and confidence. The statistical data analyzer 16 determines updates to the central geographic database 20 based on whether the central filtered sensor data set 14 reflects statistically significant variances. (Various kinds of statistical techniques for analyzing data using large numbers of readings are known and may be used.)

The statistical analysis techniques can also take into account historical information. For example, if a highly traveled road segment that was sensed thousands of times a day for years suddenly had no reported sensor readings, it would be an indication that the road was no longer open. An appropriate update to the central database, or at least an indication to verify a possible change in the database record, would be processed accordingly.

Figure 9:
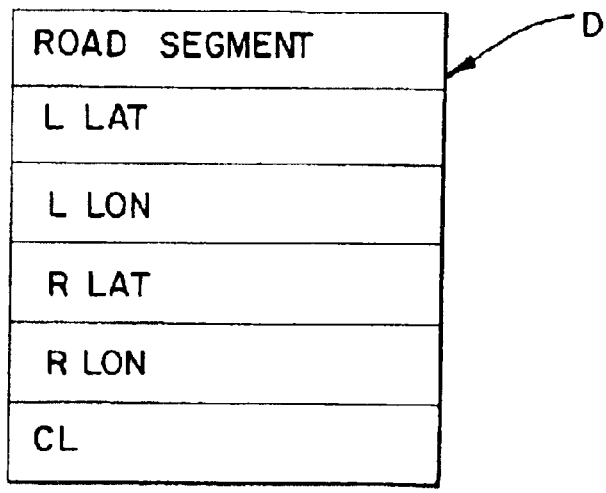
FIG. 9 is a diagram illustrating a data entity record in the geographic database including an indication of the confidence level.

The statistical data analyzer 16 may determine confidence levels for data elements in the central geographic database 20. Referring to FIG. 9, confidence levels may be stored for data elements in the central geographic database 20. The confidence level is stored as an attribute of a data entity. The confidence level may be expressed as a magnitude that is indicative of the certainty to which the data entity in the central geographic database 20 matches the actual physical feature in the geographic region. The confidence level of an item of data may be increased or decreased according to the frequency and freshness with which the feature is sensed by the data collection vehicles. In FIG. 9, a data entity D represents a road segment record having positional information attributes. The road segment attributes include the latitude and longitude of the left and right nodes (L-LAT, L-LON, R-LAT, R-LON) of the road segment data entity D. A confidence level attribute CL includes a value (e.g. 1–10) which expresses the confidence that the positional data is accurate. For example, a confidence level of "10" may indicate that, based upon the statistical analysis, there is a greater than 99% certainty that the positional data (L-LAT, L-LON, R-LAT, R-LON) is within 1 cm. A confidence level of "8" may mean that, based upon statistical analysis, there is a 75% level of certainty that the positional data is within 1 meter, or that there is a 99% level of certainty that the positional data is within 15 meters.

The statistical data analyzer 16, the operation of which is discussed further below with reference to FIGS. 5A–5L, also provides for any layout changes that may be necessary when the database is modified. Such layout changes may involve creating new links, modifying the geometry of existing links, and designating features known about the new and existing links.

According to one method of updating, the statistical data analyzer 16 provides a message 18 to initiate an update process 22 for the central geographic database 20. The update process 22 collects the individual changes to the central geographic database 20 from the statistical data analyzer 16 and stores the changes in a queue of update transactions for a distribution process 24.

In one embodiment, the steps performed in the manager 10, including the determination of variances, the collection of data from the vehicles, the analysis of statistical significance, and the updating of the central database, are performed on an ongoing and continuous basis. However, in alternative embodiments, it may be preferred to perform some of these tasks intermittently or periodically.

C. Distributing Updates to Users

Referring to FIG. 1, at some point, data reflecting the updating process applied to the central database is released to the end-users. The release and/or distribution of data may be performed by an update distributor 26. Distribution may be accomplished electronically using the wireless communication links 49. In vehicles that have communications managers (such as in FIGS. 2A and 2B), the update distributor 26 may communicate updated information from the central data manager 10 directly back to the local communications managers 58 in the individual data collection vehicles 50. Other alternative means of distribution may be used including distribution of hard media, such as CD-ROM discs and PCMCIA cards, downloading to personal computers, and so on.

The end-users may include persons who use local versions 56 of geographic databases in their vehicles. The end-users may also include various others including, for example, personal computer users 46 and networks 48, such as on-line services, services that use the Internet and organizations that incorporate all or parts of the geographic database in applications such as emergency dispatch centers, truck fleet tracking and package delivery fleet tracking.

The releases may occur on a continuous basis, or may occur from time to time, or on a regular or irregular basis, a staggered basis, and so on. The release of data reflecting the updating process can be made in any of several different formats. According to one process for releasing updated data to end-users, the updated data may be released as a series of update transactions which are applied to each user's local copy of the geographic database, as needed. According to another process for releasing data to end-users, versions of the entire database reflecting the updated data may be provided.

A flow chart illustrating the process of the system 9 of FIG. 1 is shown in FIG. 3. The computing devices (32 in FIG. 1, 53 in FIG. 2A) use output from sensors (60 in FIGS. 2A–2C) to relate (Step S2 in FIG. 3) to a geographic database (20 in FIG. 1, 56 in FIG. 2A) and perform some action based on the interpretation of the sensor data and database content. Variances, including zero-variances, between the perceived reality derived from the sensor data and the content of the map database can be stored as filtered sensor data (Steps D1, S3, S4 in FIG. 3; 14 in FIG. 1; 55F in FIG. 2A) in a storage medium and communicated to a location in a central repository for database updating processing (16 in FIG. 1). The filtered sensor database (14 in FIG. 1) preferably will retain variances to allow statistical processing for more accurate updates. (Steps D2, S5, S6 in FIG. 3). After the update process has been applied to the central database (22 in FIG. 1), database updates are communicated to end-users of the database. (Alternatively, in the embodiments of FIGS. 2B and 2C, the raw data derived from the sensor devices may be stored in some medium and communicated to a separate system for comparison against the map database outside the scope of the vehicle navigation system.)

D. Feedback Calibration of Vehicle Sensors

Figure 10:
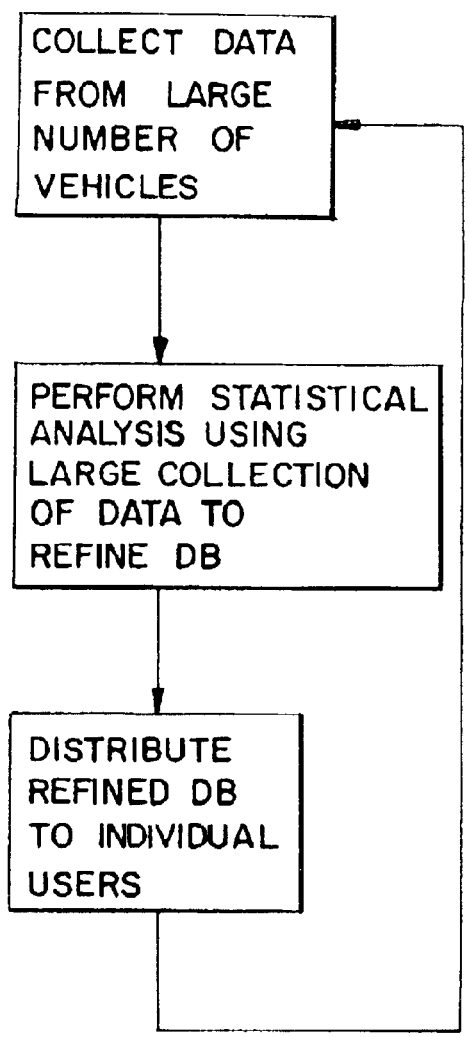
FIG. 10 is a flow chart indicating the steps for performing another aspect of a feedback process using data collection vehicles.

In a further alternative embodiment, vehicle sensors in the various end-users' vehicles are fine-tuned for very high levels of accuracy by a feedback process. The feedback process uses the collection of sensor data from a large number of vehicles (using the process described above, for example) to provide highly accurate geographic data in the central database which in turn is distributed to individual end-user vehicles and used to adjust and calibrate the sensors in each of the individual end-user vehicles to conform to the known-to-be-highly accurate geographic data. In this manner, the continued use of data collection vehicles and the redistribution of known-to-be-highly accurate data to the individual end-users' vehicles for calibrating of the sensors in the vehicles forms a feedback loop which pumps up the accuracy of the sensors in each of the individual vehicles. The accuracy that can be obtained in this manner can exceed the accuracy that could be obtained by any one vehicle or any one sensor measurement using conventional techniques. A diagram illustrating this process is shown in FIG. 10.

Using the feedback calibration process described above, highly accurate data having a high confidence level can be developed. The levels of accuracy that can be achieved can be as high as ±1 cm, or better. Given these levels of accuracy, it is possible to use a geographic database for vehicle control and safety systems. With high levels of accuracy in both the geographic database and the vehicle positioning sensors, the safety systems can automatically determine if the vehicle is deviating from the roadway, veering out of its lane, and so on. In conjunction with the high levels of accuracy, the safety systems or vehicle control systems use the confidence level attributes, described above, to confirm that the data is not only accurate but also reliable.

Figure 11:
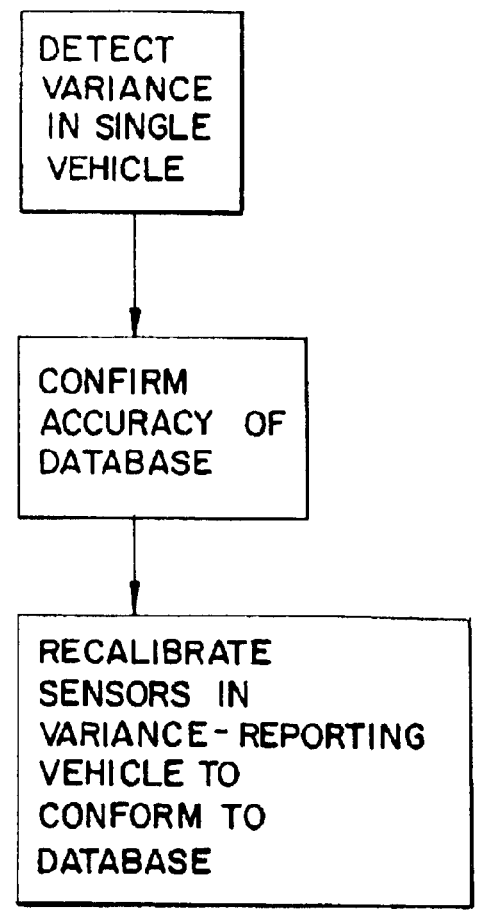
FIG. 11 is a flow chart indicating the steps for re-calibrating an out-of-calibration sensor in a vehicle.

In another alternative embodiment, out-of-alignment sensors in a vehicle can be detected and corrected using a feedback process. Using a feedback process to develop highly accurate data, as described above, once geographic data is known-to-be highly accurate (i.e. its confidence level is high) as a result of statistical analysis of a large number of data records collected from a large number of vehicles over a significant period of time, if one vehicle using the data reports variances, then it can be determined that the sensors in the variance-reporting vehicle are likely out of calibration. Then, using only the variance data reported from the one vehicle and the known-to-be-highly accurate data, the sensors in the variance-reporting vehicle are re-calibrated to the same level of accuracy as all the other vehicles. (It is understood that as a step in the process, it may be required to acquire data for a period of time from other data-collecting vehicles after the variances are collected from the variance-reporting vehicle to confirm that other data-collecting vehicles do not observe the same variances.) A diagram illustrating this process is shown in FIG. 11.

In further aspect of this embodiment, the data collection systems in each of the data collection vehicles provide data that identifies of the types of sensors being used to collect the data. Then, when variances from a vehicle are collected, the type of sensors measuring the variances are taken into account. For example, if a type of sensor reports variances that suggest it should be re-calibrated, it is first compared to similar kinds of sensors. This permits a better evaluation of the extent to which the particular type of sensor can be calibrated based on the accuracy which is achievable in like-equipped vehicles.

V. Processing Sensor Data

A. Comparing the Sensor Data and a Geographic Database

Figure 4C:
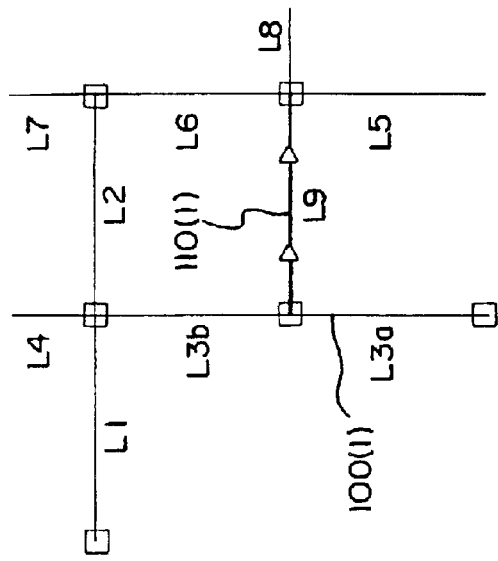

Processing of a modification to an existing database based upon the collection of data from a single vehicle is illustrated in connection with FIGS. 4A–4C. This example refers to positional information (latitude, longitude, and altitude) and illustrates attempts to match positional sensor data to the elements in a geographic database (e.g. the central geographic database 20 in FIG. 1 or the map database 56 in FIGS. 2A and 2B). Similar steps would be used for other types of data.

FIG. 4A graphically depicts an area that may be represented in a geographic database. FIG. 4A illustrates map positions 80(1), 80(2) . . . 80(n) and map links 100(1), 100(2), . . . 100(n) representing road segments, connecting the map positions 80. In FIG. 4B, a set of actual positions 90(1) . . . 90(n) established by the sensor devices on the vehicle are denoted as arrows with time sequence identifiers T1–T14. The map matching process uses the vehicle's bearing, proximity to that link 100(1), and various link features to place the vehicle on a matched link 100(1).

The sensor data points are compared to map positions 80 and the matched link 100(1) by determining the shortest distance from the sensor data point to the matched link 100(1). If the resulting distance exceeds specified tolerance levels, or if sensor data conflicts with features of the matched link 100(1), a record of this variance is created along with relevant sensor data. The record, illustrated in FIG. 4C as a new link 110(1), is then stored in the filtered sensor database (55F of FIG. 2A or 14 of FIG. 1).

If a link is traversed with all sensor samples within the tolerance level, a record is created in the filtered sensor database, certifying the accuracy of the matched link and its features and identifying the sensor device or devices used.

Figure 4E:
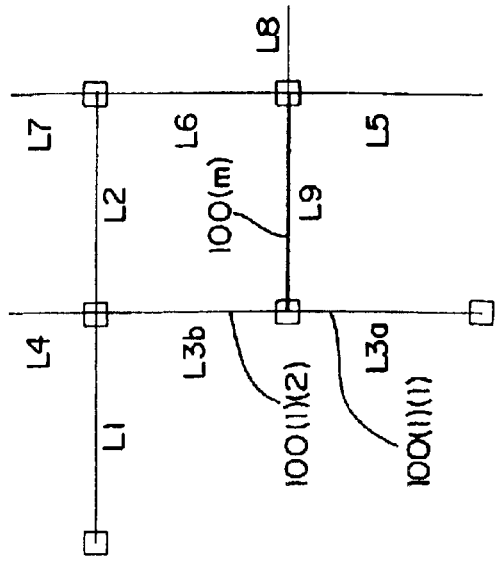
Figure 4B:
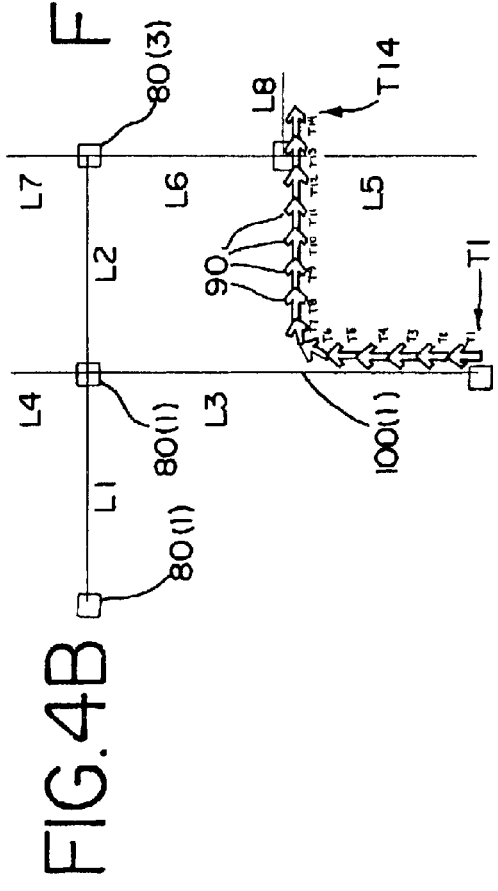
Figure 4D:
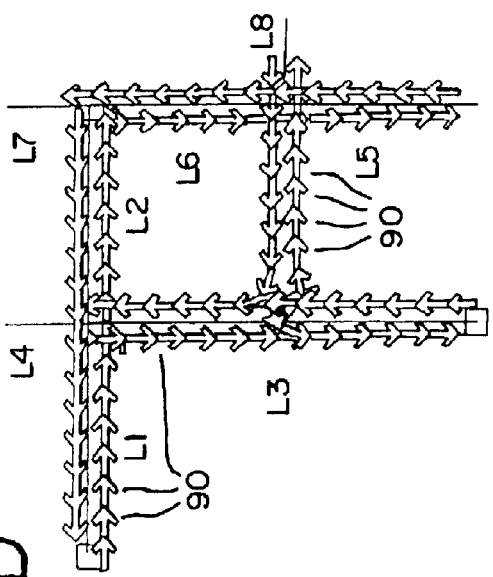

FIG. 4D illustrates the collection of data over time with numerous collections of sensor data, which would result in a database update as indicated in FIG. 4E.

B. Updating the Central Geographic Database

The filtered sensor data includes information regarding potential new links and may be used to determine whether the geographic database is to be updated. During the update of the geographic database, features relative to the actual position may be determined from the sensor data. Data relating to such features may be included as filtered sensor data so that the features may be included in the update of the geographic database. For example, if only the data collection shown in FIGS. 4B and 4C were available, the new link 100(m) (also labeled L9) can be traversed from left to right (in the direction the collector vehicle traveled) based on the single collection of sensor data. When the new link 100(m) is added to the central geographic database 20 during an update operation, the restriction of allowing travel in the single direction may be added as a feature of the new link 100(m) until sensor data is received to indicate that travel may be allowed in the other direction.

The filtered sensor data may provide information regarding other features that may be used during the update of the geographic database. For example, the addition of the new link 100(*m*) forms two new links labeled 100(1)(2) (also L3*b*) and 100(1)(1) (also L3*a*) where previously only 100(1) (labeled L3) existed as illustrated in FIG. 4C. The update of the geographic database may include a feature allowing vehicles to traverse from link L3*a* to L9 (labeled 100(*m*)), but not from L3*b* to L9. The feature may be revised if data supporting travel from L3*b* to L9 is received.

FIGS. 5A–5L illustrate time sequence examples of using sensor data to update the geographic database. FIGS. 5A–5F illustrate a method of using sensor data to update the geographic database for a single sample of sensor data. FIGS. 5G–5L illustrate a method of using sensor data to update the geographic database after a second sample of data has been collected on the same link.

Figure 5B:
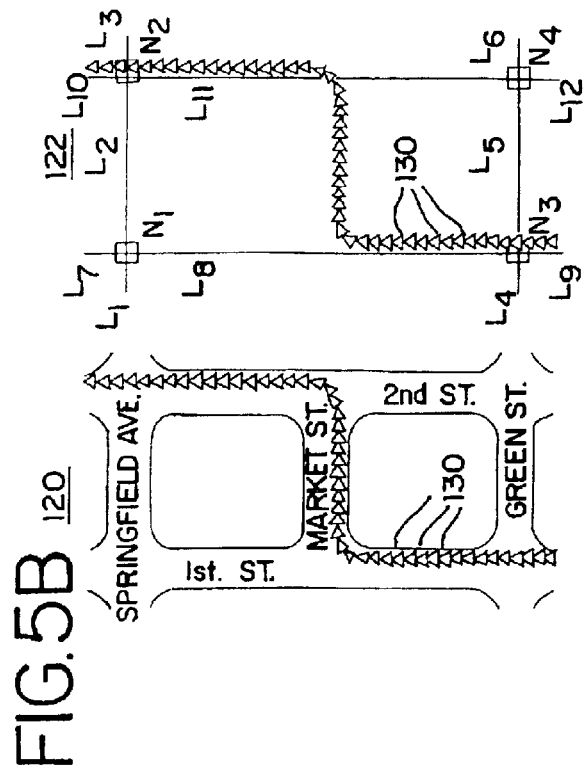
FIGS. 5A–5L illustrates the method of using the system in FIG. 1 as applied to a sample portion of a geographic data set.
Figure 5D:
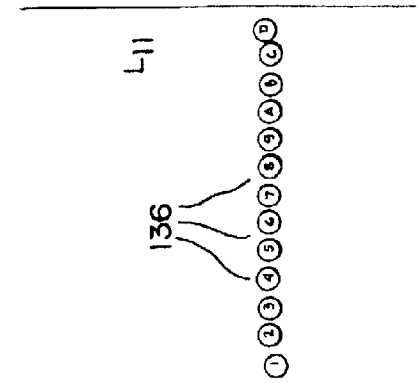
Figure 5A:
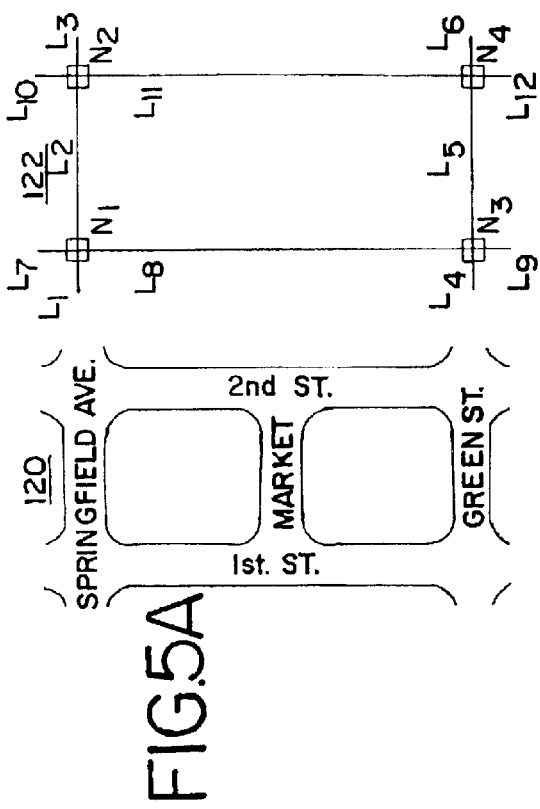
Figure 5C:
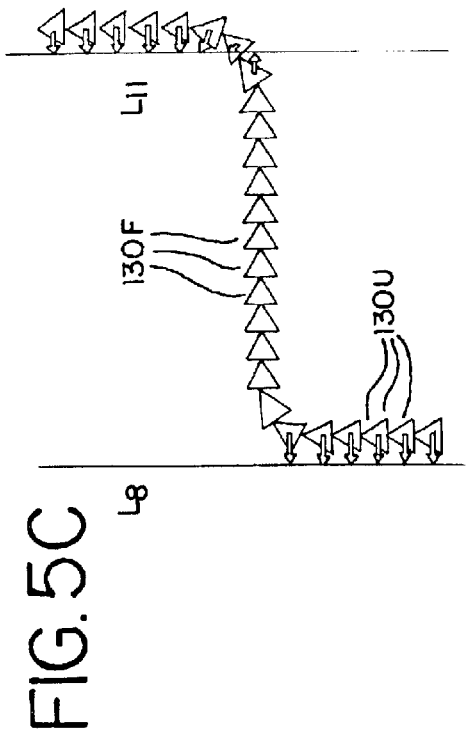

FIG. 5A contains a sample road network 120 and an example of a graphical representation 122 of the geographic database 20 (shown in FIG. 1) at its time of release. The geographic database 20 contains no link for Market St. between 1st St. and 2nd St. FIG. 5B illustrates the tracking of a vehicle with sensor devices generating actual positions 130, in relation to both the road network 120 and the database 122. The unfilled triangles 130U in FIG. 5C represent positions which were able to match to links in the database as denoted by the arrows. The filled triangles 130F in FIG. 5C represent positions which would exceed map matching tolerance levels and therefore induce the map matching process to store these positions as unmatched in the filtered sensor database. The unmatched positions may be stored as an ordered set of points 136 as shown in FIG. 5D. The contents of the entry in the filtered sensor database would be the previous link L8 successfully matched, the latitude/longitude of each unmatched position, and the next link L11 successfully matched. The data analyzer processor 16 (in FIGS. 1 and 2A) then derives a new link using the method illustrated in FIGS. 5E and 5F.

A new link may be derived by determining the shortest distance 180 from the first unmatched position 175 to the previous link L8, and splitting the link at that nearest point 190 on the link L8 creating two new links L8A and L8B out of link L8. The processor 16 then determines the shortest distance 182 from the last unmatched position 176 to the next link L11 matched, and splitting the link at that nearest point 192 on link L11, creating two new links L11A and L11B out of link L11.

Figure 5F:
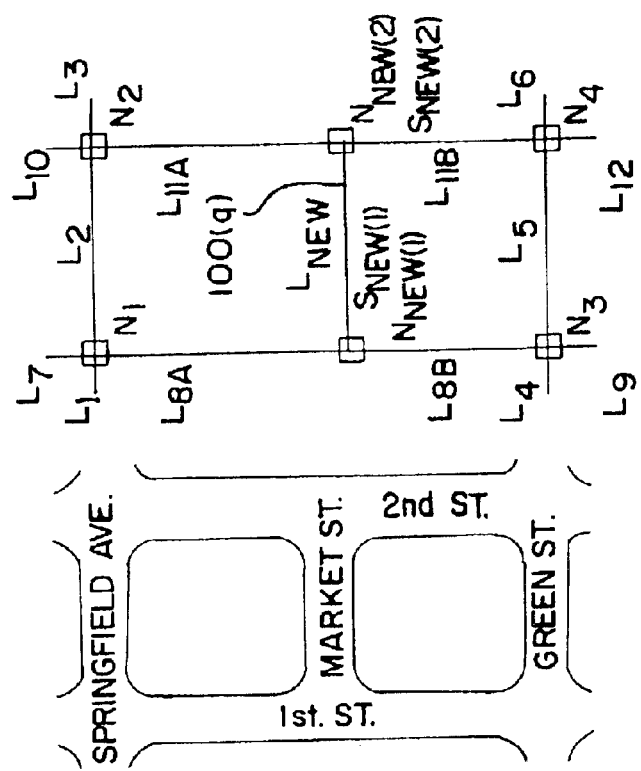
Figure 5E:
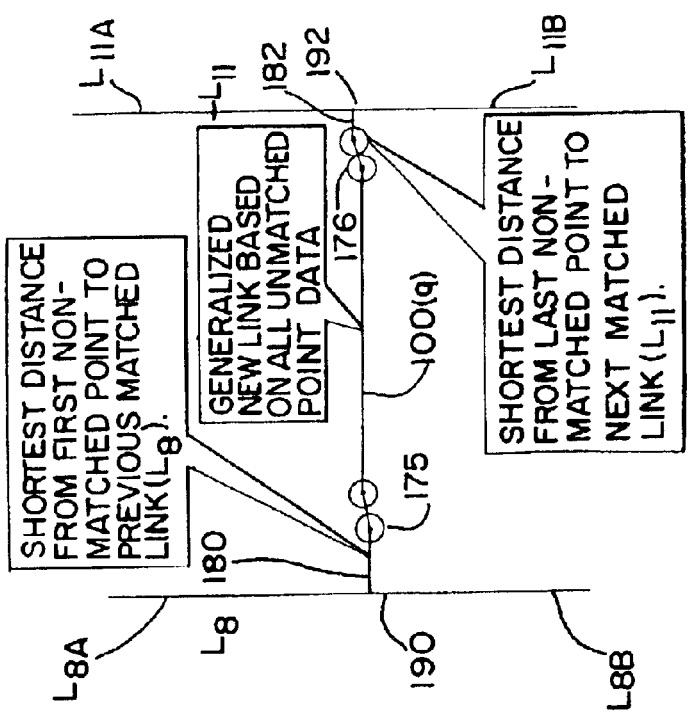

Beginning at the intersection of L8A and L8B, the new link 100(*q*) is constructed by joining all unmatched positions and terminating at the intersection of links L11A and L11B as shown in FIG. 5E. The filtered position database is then updated to associate all unmatched positions with the new link 100(*q*).

The resulting database content is illustrated in FIG. 5F. At this point, features may be added to this new link which may include the direction of travel (from left to right), the average speed, and the fact that turns can legally be made from L8B to 100(*q*), and from 100(*q*) to L11A.

Figure 5G:
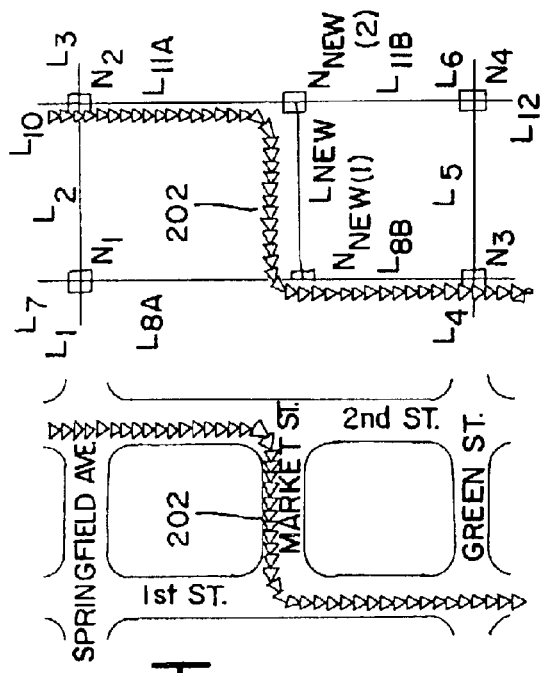
Figure 5H:
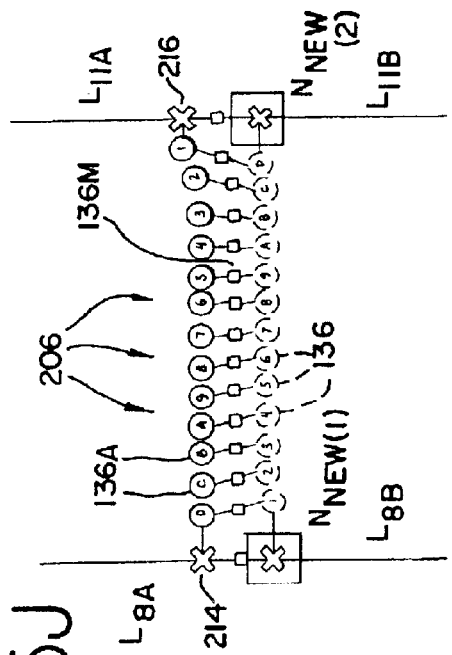
Figure 5I:
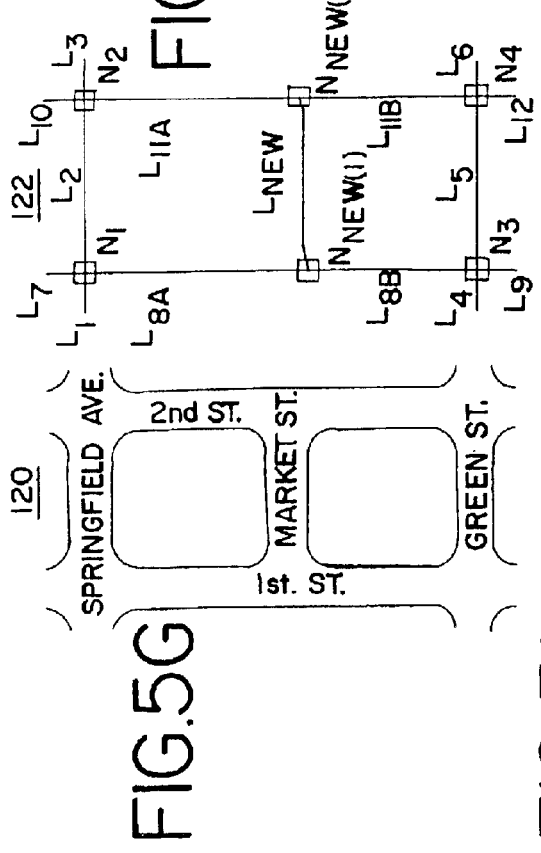
Figure 5J:
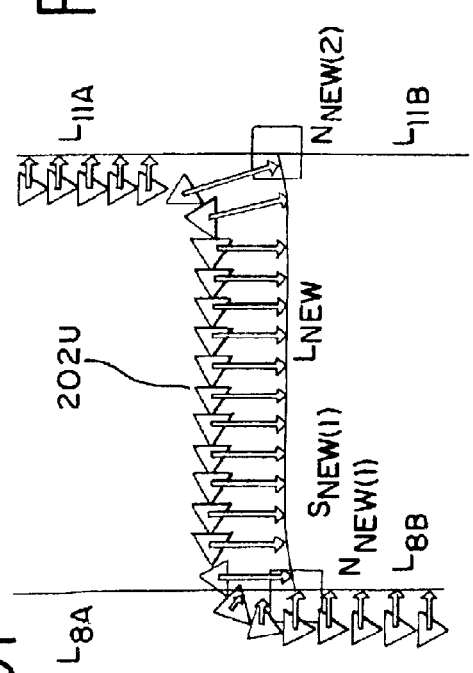

FIGS. 5G–5L illustrate a process of using sensor data to update the geographic database after a second sample of data has been collected. FIG. 5G contains the same example of the road network 120, and the depiction of the map database 122 as updated in FIGS. 5A–5F. FIG. 5H contains a new set of sensor data points 202 for a vehicle traveling in the opposite direction. FIG. 5I highlights the positions 202U which exceeded map matching tolerance levels, but may have been determined to match the new link 100(*q*). The map matching process will store these positions 202U with the filtered sensor data as an ordered set of points 206 as shown in FIG. 5J. The filtered sensor data may include the previous link matched L11A, the ordered set of points 206, the next link matched L8B, and the assumed match 100(*q*). The sensor data processor would then update the geographic database using a process described below with reference to FIGS. 5J, 5K and 5L.

In updating the geographic database, all ordered sets of points from the filtered sensor data which have been associated with the new link 100(*q*), which in this example is the ordered sets of points 206, are identified. In addition, all positions for the same direction of travel as the positions being processed (in this example, the ordered sets of points 206) are identified. In this example, the positions represented by the ordered set of points 206 are for the direction opposite the direction of the new link 100(*q*). The ordered set of points 206 are then averaged using a sequential averaging or curve fitting technique to create a single sequence of positions.

An intersection point 214 with the nearest link to the beginning position of the ordered set 206 is identified. An intersection point 216 with the nearest link to the ending position in the ordered set is also identified.

All points having a direction of travel opposite the direction of the ordered set of points 136 are then averaged using the sequential averaging or curve-fitting technique to create an opposite direction ordered set of points 136A. In the example in FIG. 5J, no points were collected in the second sample traveling in the same direction as the new link 100(*q*). Therefore, the new link 100(*q*), or points in the new link 100(*q*), may be used for the opposite direction ordered set of points 136A.

Figures 5K, 5L:
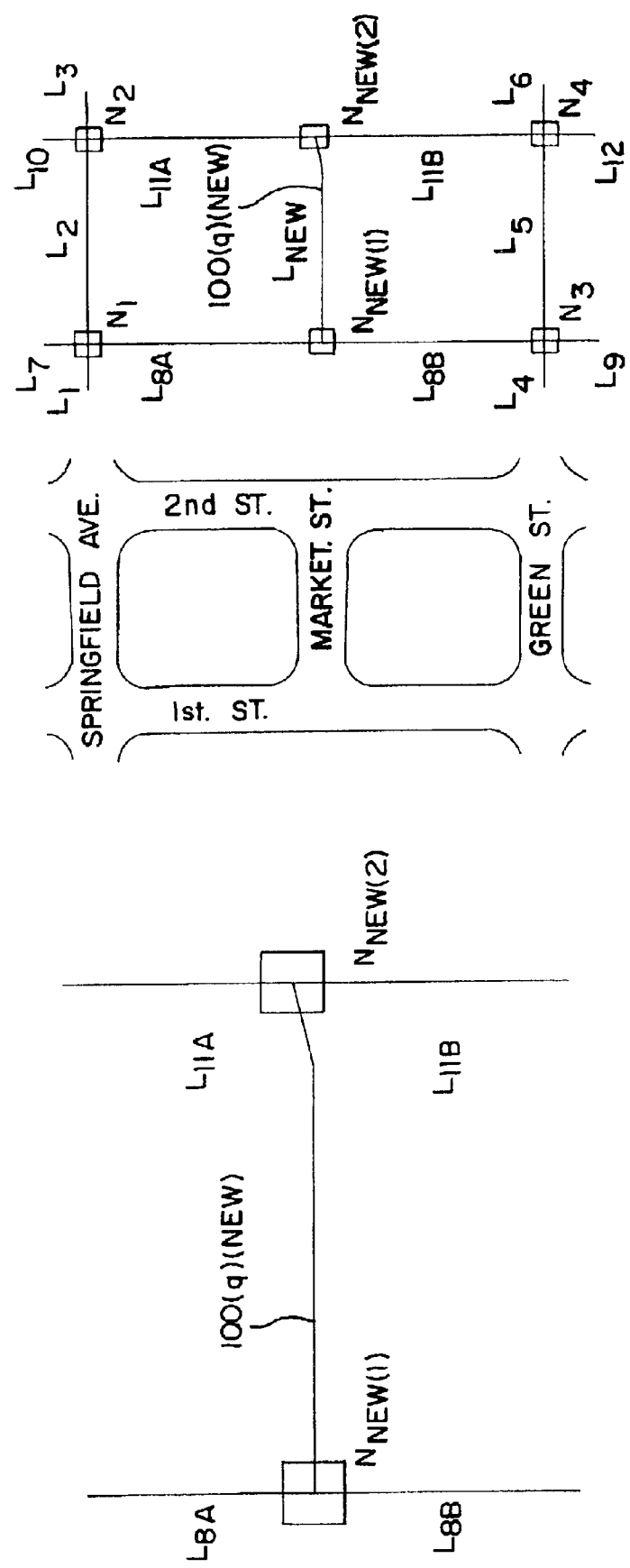

The distance between the sets of points in opposite directions 136, 136A is averaged by calculating half the distance from each point starting with the ordered set of points represented by the most points to yield a set of average points 136M in FIG. 5J. The average points 136M are then designated as the new link 100(*q*)(new) in FIG. 5K. Alternatively, the new link 100(*q*)(new) could be modified by moving it to correspond with the average points 136C. The link features may now be updated to identify the direction of travel as being both directions. The average speed may also be updated. It may be assumed that turns can be legally made from L11B to 100(*q*)(new) and from 100 (*q*)(new) to L8B. The resulting database content is illustrated in FIG. 5L.

C. Trend Analysis

Figure 6C:
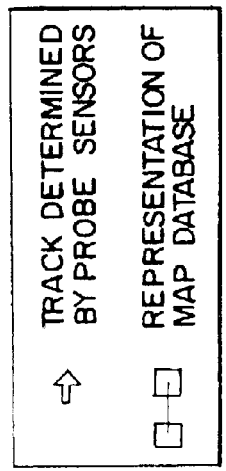
FIGS. 6A–6E illustrate an enhancement to the method of using the system of FIG. 1.
Figure 6A:
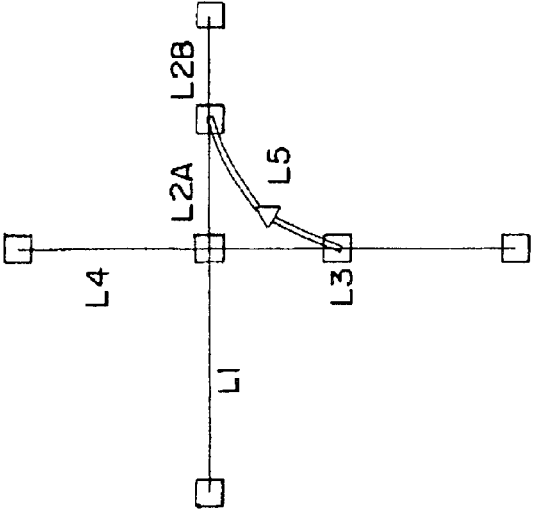
Figure 6A:
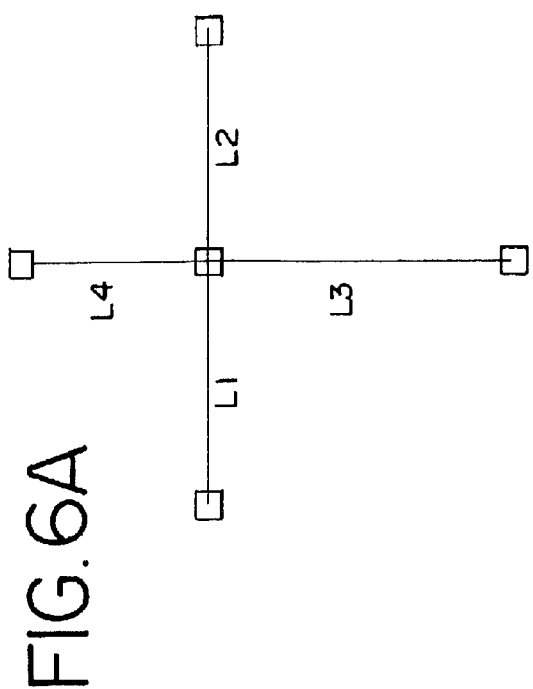
Figure 6B:
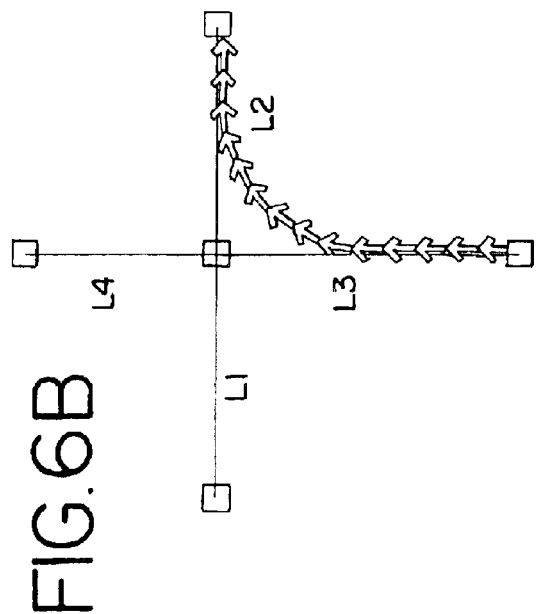
Figure 6E:
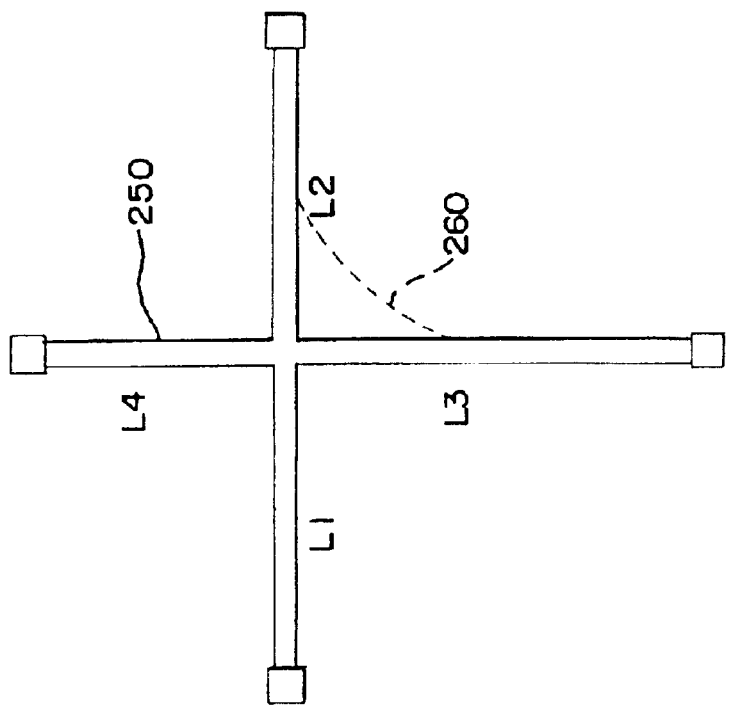
Figure 6D:
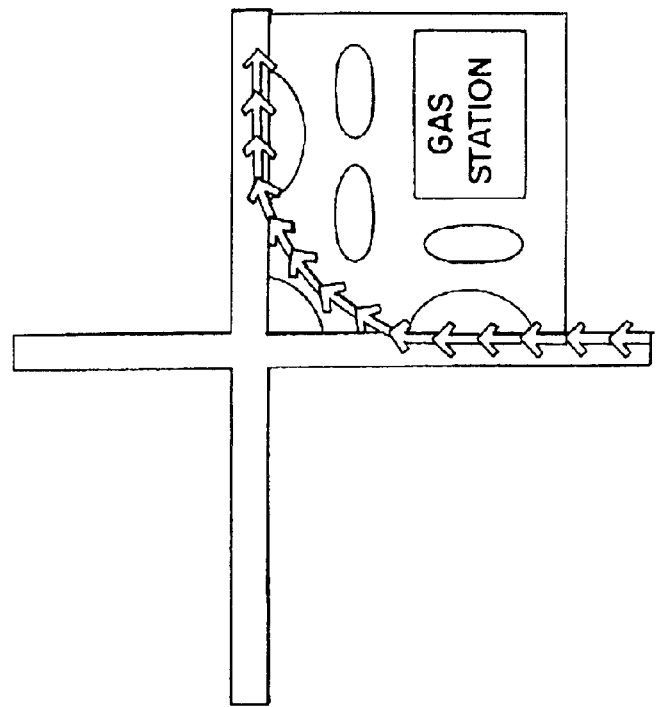

The collection of data over time illustrated in FIG. 4D may be subjected to a process of trend analysis as illustrated in FIGS. 6A–6E. The addition of link L5 in FIG. 6C may be used as an update to the map database in FIG. 6A, based on the sensor data provided from the samples in FIG. 6B. However, FIG. 6D illustrates that the path of the vehicle was actually a maneuver through a filling station. FIG. 6E illustrates a trend analysis, with the dense lines 250 representing a high instance of sensor data positions and the dotted line 260 representing the single traversal of the vehicle whose path is defined in FIG. 6B. Applying statistical analysis of the entire sensor collection would result in the link L5 being classified as statistically insignificant and not being added to the geographic map database 20.

Figure 7A:
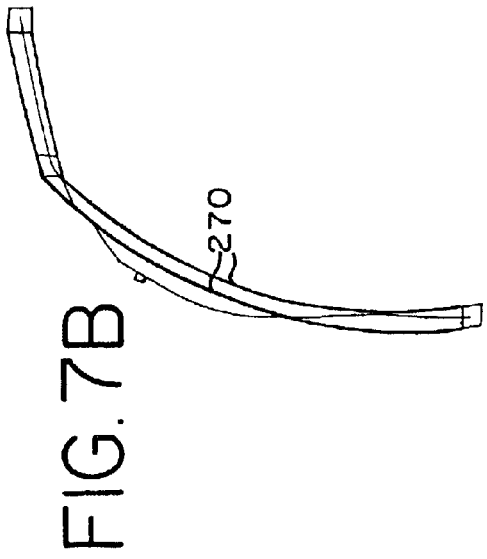
FIGS. 7A–7D illustrate another enhancement to the method of using the system of FIG. 1.
Figure 7B:
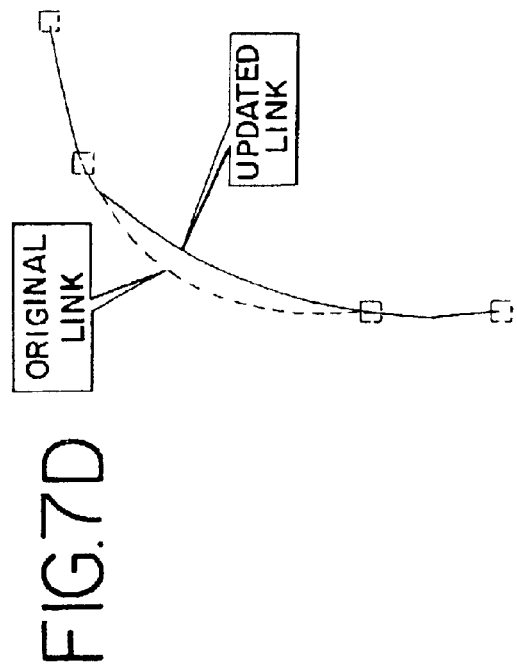
Figure 7C:
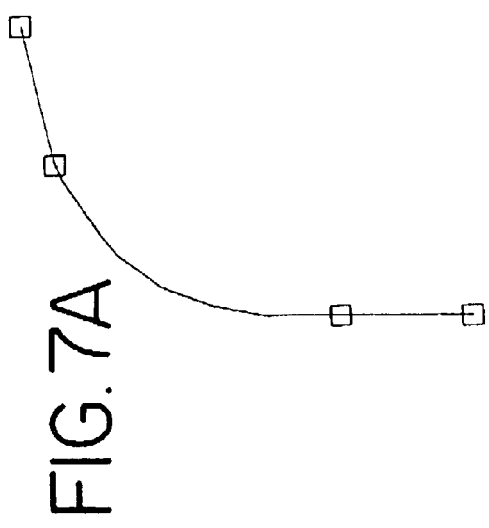
Figure 7D:
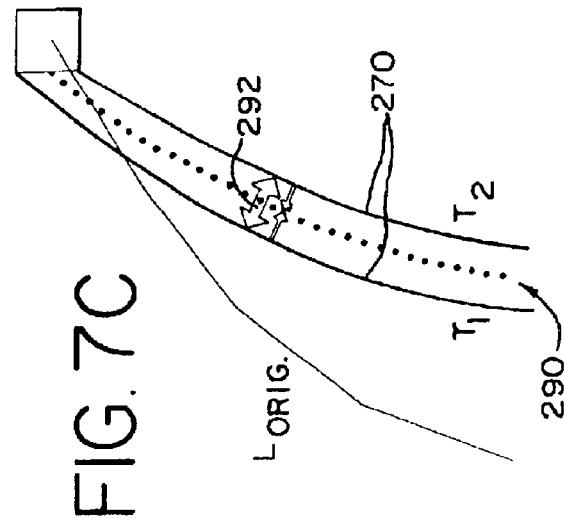

FIGS. 7A–7D further illustrate how geographic updates can be implemented using sensor data from a feedback loop with trend analysis. A graphical illustration of a portion of the map database 20 in its original state is shown in FIG. 7A. FIG. 7B represents the original database content with the heavier arcs 270 representing the average paths determined from sensor data. The two distinct arcs may be dependent upon bearing and statistical normalization. As illustrated in FIG. 7C, a new arc 290 is generated at the geometrical center 292 of the tracking arcs T1 and T2. The original link $L_{orig}$ is then updated to reflect the new geometry defined by the new arc 290. Curve fitting and other standard techniques could be employed alternatively to determine positional changes.

D. Variances of Data Representing Other Features

Figure 8A:
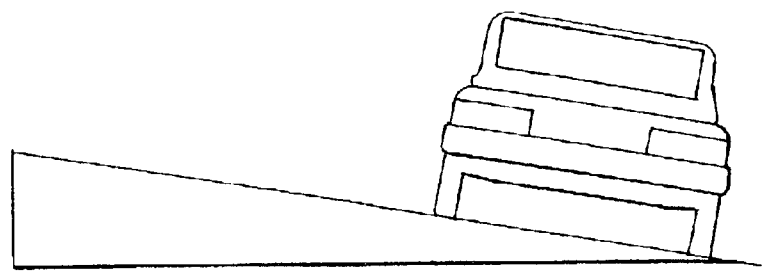
FIGS. 8A–8G illustrate a method of using the system in FIG. 1 as applied to non-positional features of a geographical area.
Figure 8B:
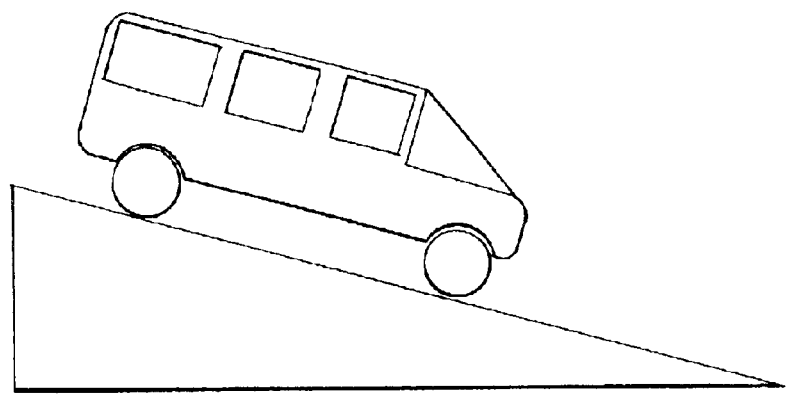
Figure 8C:
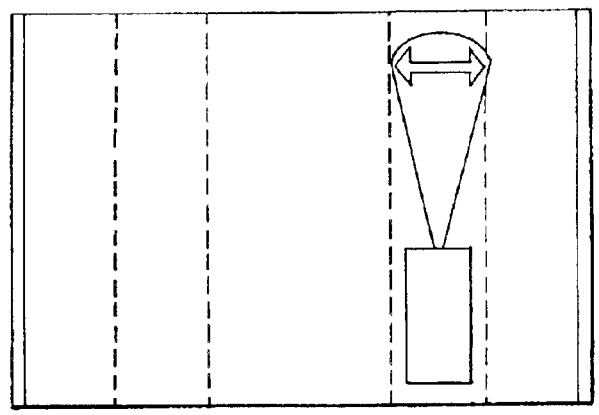

The same process for determining variances used to collect basic positional information (latitude, longitude, and altitude) as shown in FIG. 3 can also be applied to other physical features which describe the physical road structure. For example, FIGS. 8A–8B illustrate vehicles that are collecting road gradient information. FIG. 8C illustrates a vehicle that is collecting information regarding road width, lane width, and shoulder width. The information provided by the sensor devices is compared against the database and variance/confidence information is communicated through the loop described above with reference to FIGS. 3 and 4A–4E. This type of data is used by advanced vehicle safety systems, described above, because the more accurate and refined the database, the earlier and more intelligently system action can be taken. By reducing the margin of error for lane width, a system which detects erratic driving patterns can engage earlier and be more successful. A system which detects excessive speed during curve traversal can more accurately determine the maximum safe speed based on the bank of the curve.

Sensor devices which can identify objects in the path of a vehicle can be confused by permanent structures (for example signs, pillars, overpasses, poles, etc.). Maintaining an accurate model of these permanent structures can enable the sensor devices to filter out objects that may otherwise be interpreted as a potential hazard. By increasing the confidence level of the database, as described above, systems that identify road hazards can engage with the appropriate action more reliably. Variances may be determined for database elements that represent objects when compared to images sensed from image sensors using a process similar to the process in FIG. 3. In connection with the detection of images, signs or other landmarks can be detected by cameras using image or shape detecting programs. The sign text on the signs is recorded and variances are stored, as described above. In addition, the location of signs or other road side landmarks can be sensed, stored, and compared for variances. These landmarks can include not only signs, but any detectable feature, including lamp posts, viaducts, etc. The position of any detectable feature can be measured for variances and used for calibration, generating confidence levels, and so on. In this manner, the positions of many kinds of landmarks can be detected relatively inexpensively.

Knowledge of, and greater precision in, the position data for permanent structures also facilitates vehicle positioning useful in route guidance and other applications. For example, when a vehicle travels a significant distance along a straight road, the vehicle's position can become more uncertain as errors associated with the positioning sensors accumulate. Enhanced knowledge of the position of permanent structures along such straight roadways can serve as a landmarks to which the vehicle position can be corrected (or map-matched) when the landmark is sensed.

In an embodiment illustrating this feature, a vehicle includes sensors which may be similar to the sensors 60 in FIGS. 2A–2C. The vehicle sensors have the capability to detect structures. In one embodiment, the structure-detecting sensor is a radar system. The vehicle also includes an automatic vehicle control system and includes a local geographic database (similar to the database 56 of FIGS. 2A and 2B). The local geographic database has data that includes road side detectable features, such as sign posts, viaducts, lamp posts, and so on. The local geographic database also includes data relating to roads. Using the detection of the road side structures, such as lamp posts, viaducts, and so on, the position of the vehicle in the geographic region can be determined by a map matching program. Map matching programs are known. Given the known locations of radar-detectable features, such as lamp posts, viaducts, for example, the position of the vehicle can be determined very accurately by matching the vehicles' position onto road segments in the geographic database. The position of the vehicle can be fine-tuned by matching the position to the known positions of the detectable roadside landmarks. With this level of accuracy, an automatic safety system can be implemented that automatically avoids obstacles detected by the radar.

Figure 8D:
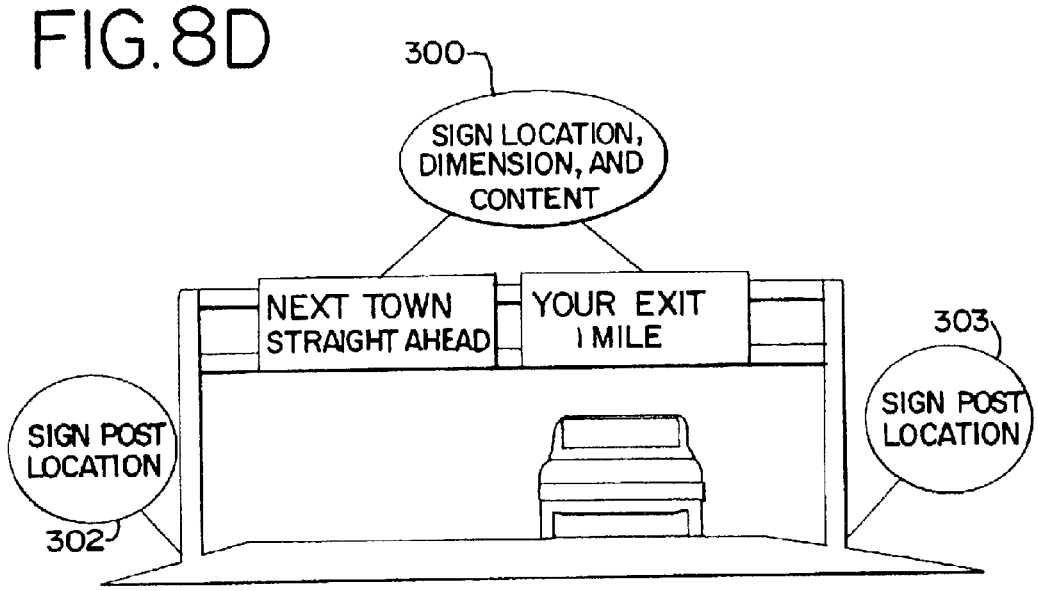
Figure 8E:
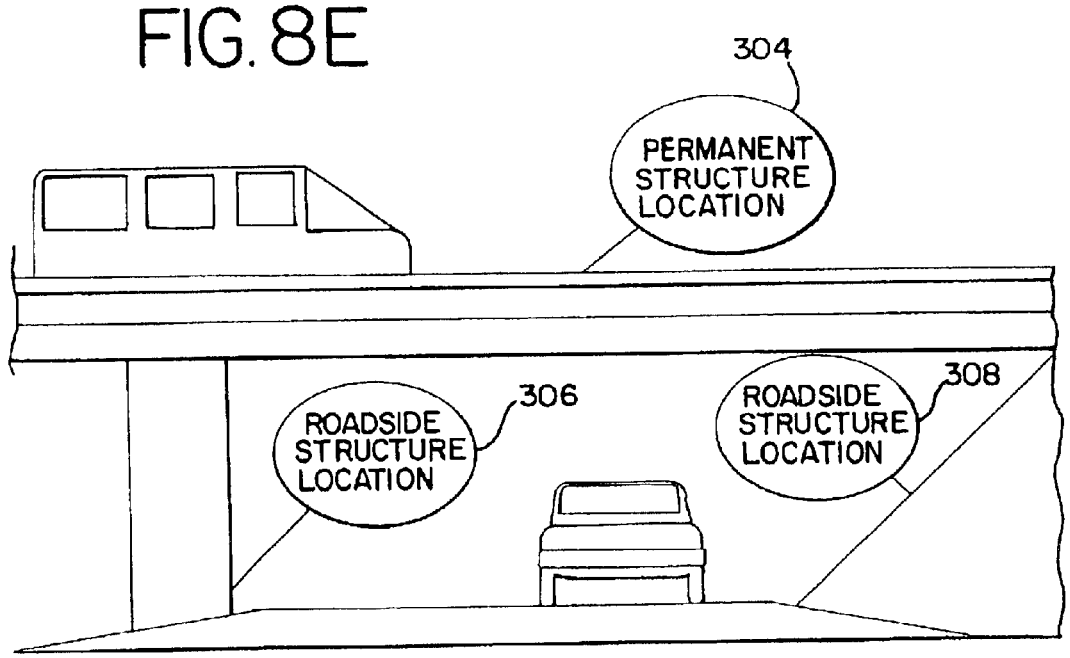
Figure 8F:
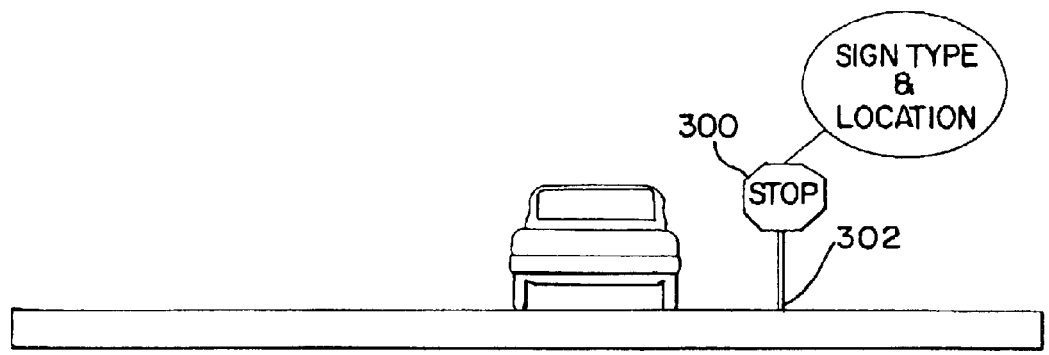
Figure 8G:
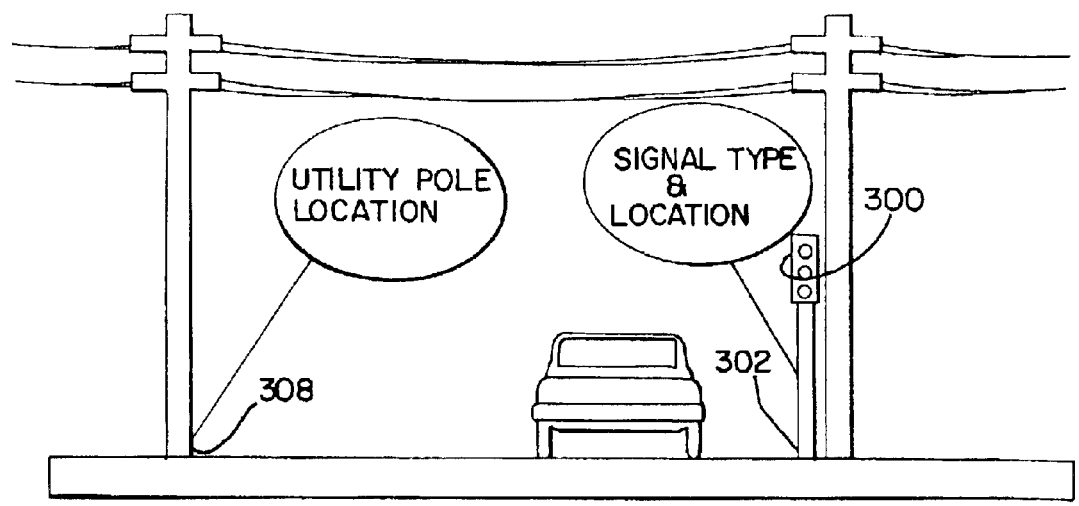

As shown in FIGS. 8D–8G, the sensor devices, which for permanent structure analysis includes image sensors, determine static elements in the field of vision, compare the image footprint to the database and record the difference or confidence information as necessary. FIGS. 8D, 8F and 8G illustrate how image sensors identify signs according to sign location, dimension and content at 300 and sign post location at 302. FIGS. 8E and 8G illustrate how image sensors may identify permanent structures such as guard rails 304, bridge supports 306 and nearby structures 308.

Sensor data may also be evaluated with respect to non-positional features that may be represented in the database to identify potential errors and establish confidence levels for these features. Examples of features to evaluate include: direction of travel, divider location, speed limit, and turn restrictions. The features of the links contained in the geographic database would be processed in the same manner as positional data. If one collector vehicle traverses a link in the opposite direction of travel as maintained in the map database 56, but a significant number of other collections indicate tracking in the same direction of travel as maintained in the map database 56, the single case may be archived as statistically insignificant.

Embodiments of a system for updating a geographic database have been described. Alternative embodiments can be appreciated from this disclosure by one of ordinary skill in the art. For example, the central geographic data manager 10 may collect only raw data or only filtered sensor data such that it would include only a raw sensor data collector 28 or a filtered sensor data collector 12 and the components used to process either raw sensor data or filtered sensor data. In addition, no limitation is placed on the scheduling of the distribution of updates by the update distributor 26. Updates may be distributed according to a schedule, or in a manner.

Advantages of the embodiments of the systems described herein include the ability to receive data for processing database updates directly from users of the navigation system. Because the users of the navigation system may be numerous, this may reduce the need to take measures to determine if changes have occurred to the geographical area, such as, sending employees to verify the area such as by visiting the area and recording information or by taking aerial pictures or by checking municipal records.

Presently preferred embodiments of the present invention have been described. One of ordinary skill in the art can appreciate that other embodiments that fall within the scope of the claims are possible. It is intended that the foregoing detailed description be regarded as illustrative rather than limiting and that it is understood that the following claims including all equivalents are intended to define the scope of the invention.

We claim:

1. A method of collecting data for a geographic database comprising:
   equipping end users' vehicles with data collection equipment whereby each of said end users' vehicles also includes a navigation system that uses a map database to provide navigation-related features;
   using said data collection equipment in each of said end users' vehicles to collect data while said end users' vehicles are being driven along roads;
   sending at least a portion of the data collected by said data collection equipment to a central database manager; and
   updating a central geographic database using the data collected by said data collection equipment.

2. The method of claim 1 wherein the data collected with the data collection equipment located in said end users' vehicles represent positions of said end users' vehicles as said end users' vehicles are being driven along said roads.

3. The method of claim 1 wherein the data collected with the data collection equipment located in said end users' vehicles represents positions of roadside features.

4. The method of claim 1 further comprising:
   prior to the sending step, in at least some of the end users' vehicles, filtering the data collected while said end users' vehicles are being driven along roads.

5. The method of claim 4 wherein the filtering step comprises:
   comparing the data collected while said end users' vehicles are being driven along roads to a threshold.

6. The method of claim 5 wherein the portion of data sent to the central database manager excludes the data collected while said end users' vehicles are being driven along roads that does not exceed the threshold.

7. The method of claim 1 further comprising:
   distributing updated data based on the updated central geographic database to the end user' vehicles.

8. A method for updating a geographic database comprising:
   equipping a plurality of end users' vehicles with data collection equipment, wherein the data collection equipment in each vehicle provides for determining positions of the vehicle as the vehicle travels and recording data indicating the positions;
   collecting the data from the plurality of end users' vehicles;
   comparing the data collected from the plurality of end users' vehicles to data contained in a central geographic database; and
   identifying a new road not represented by data contained in the central geographic database when the data collected from at least one of the end users' vehicles does not match data contained in the central geographic database.

9. The method of claim 8 further comprising:
   adding new data to the central geographic database to represent the new road.

10. The method of claim 9 further comprising:
    prior to adding the new data, performing a statistical analysis of the data collected from the end users' vehicles that does not match data contained in the central geographic database.

11. The method of claim 8 further comprising:
    distributing updated data that represents the new road to the end users' vehicles.

12. A method for updating a geographic database comprising:
    equipping a plurality of end users' vehicles with data collection equipment, wherein the data collection equipment in each vehicle provides for determining positions of the vehicle as the vehicle travels and recording data indicating the positions;
    collecting the data from the plurality of end users' vehicles;
    comparing the data collected from the plurality of end users' vehicles to data contained in a central geographic database; and
    assigning a high confidence level to data contained in the central geographic database that are matched by the data collected from the end users' vehicles.

13. The method of claim 12 wherein the confidence level takes into account the number of end users' vehicles from which data that have been collected match the data contained in the central geographic database.

14. The method of claim 12 wherein the confidence level takes into account freshness of the data that have been collected from end users' vehicles that match the data contained in the central geographic database.

15. The method of claim 12 further comprising:
    distributing data that represents the confidence level to the end users' vehicles.

16. A method for updating a geographic database comprising:
    equipping end users' vehicles with data collection equipment, wherein the data collection equipment in each vehicle provides for determining positions of the vehicle as the vehicle travels and recording data indicating the positions;
    collecting the data from the end users' vehicles;
    comparing new data collected from the end users' vehicles to data collected historically;
    upon determining that the new data differs from the data collected historically, updating a central database to indicate the new data.

17. The method of claim 16 further comprising:
    after updating the central database, distributing updated data based on the updated central geographic database to the end users' vehicles.

18. A method for updating a geographic database comprising:
    equipping end users' vehicles with data collection equipment, wherein the data collection equipment in each vehicle provides for determining positions of the vehicle as the vehicle travels and recording data indicating the positions;
    collecting the data from the end users' vehicles;
    comparing new data collected from the end users' vehicles to data collected historically;
    upon determining that the new data differs from the data collected historically, verifying need for changing data contained in a central database to indicate the new data.

19. The method of claim 18 further comprising:
    after updating the central database, distributing updated data based on the updated central geographic database to the end users' vehicles.

* * * * *